(12) United States Patent
Mathew (10) Patent No.: US 9,376,013 B2
(45) Date of Patent: Jun. 28, 2016

(54) COMPOSITE FUEL TANK SUPPORT (71) Applicant: KIRCHHOFF Van-Rob Automotive, Troy, MI (US)

(72) Inventor: Boney Mathew, Auburn Hills, MI (US)

(73) Assignee: Kirchhoff Van-Rob Automotive, Aurora, Ontario (CA)

( * ) Notice: Subject to any disclaimer, the term of this patent is extended or adjusted under 35 U.S.C. 154(b) by 0 days.

(21) Appl. No.: 14/704,259

(22) Filed: May 5, 2015

(65) Prior Publication Data

US 2016/0039282 A1 Feb. 11, 2016

Related U.S. Application Data

(60) Provisional application No. 62/033,262, filed on Aug. 5, 2014.

(51) Int. Cl.
| | |
|---|---|
| *B32B 15/08* | (2006.01) |
| *B60K 15/07* | (2006.01) |
| *B60K 15/03* | (2006.01) |
| *B60K 15/067* | (2006.01) |

(52) U.S. Cl.
CPC ....... *B60K 15/07* (2013.01); *B60K 2015/03486* (2013.01); *B60K 2015/0675* (2013.01)

(58) Field of Classification Search
CPC .... B32B 15/14; B32B 15/08; B32B 2605/00; B32B 2260/046; B60K 15/067; B29C 70/088
See application file for complete search history.

(56) References Cited

U.S. PATENT DOCUMENTS

| | | | | |
|---|---|---|---|---|
| 3,668,740 A | * | 6/1972 | Pearson | B29C 70/347 24/16 PB |
| 4,765,635 A | * | 8/1988 | Okada | B60K 15/067 137/354 |
| 4,886,180 A | * | 12/1989 | Bonczyk | B60K 15/00 220/646 |
| 5,267,714 A | | 12/1993 | Nelson, II | |

(Continued)

FOREIGN PATENT DOCUMENTS

| | | |
|---|---|---|
| CA | 2237029 A1 | 11/1998 |
| CN | 103832268 A | 6/2014 |

(Continued)

OTHER PUBLICATIONS

Dorman Fuel Tank Strap Kit, http://www.carid.com/dorman/fuel-tank-strap-kit.html.

*Primary Examiner* — Rodney Mintz
*Assistant Examiner* — Daniel Kenny
(74) *Attorney, Agent, or Firm* — Dickinson Wright PLLC (57) ABSTRACT

A composite fuel tank support includes a strap 20 having a U-shape 22, 24, 26. The U-shape 22, 24, 26 includes a base portion 22, a first leg 24, and a second leg 26. An anchor 32 extends transversely from each of the legs 24, 26 and parallel to the base portion 22. The strap 20 defines a plurality of layers 34, 36 including a fortification layer 34 and a shield layer 36. The fortification layer 34 includes basalt and a plurality of reinforcement fibers interweaved together. Each of the anchors 32 defines a bore 44 disposed on a center axis A extending through the layers 34, 36. A compression limiter 54 is disposed in the bore 44. A cover 60 is disposed over each of the anchors 32. Each of the covers 60 defines a void 62 disposed concentric to the bore 44 with the compression limiter 54 disposed in the void 62. The shield layer 36 defines an anti-slip surface 70 having a plurality of projections 72 for engaging the fuel tank 28.

16 Claims, 6 Drawing Sheets

(56) References Cited

U.S. PATENT DOCUMENTS

| | | | |
|---|---|---|---|
| 6,070,730 A * | 6/2000 | Narisawa | G11B 33/0444 206/454 |
| 6,277,771 B1 | 8/2001 | Nishimura et al. | |
| 6,340,143 B1 * | 1/2002 | McCraney | F24H 9/06 248/154 |
| 6,468,613 B1 | 10/2002 | Kitano et al. | |
| 6,578,727 B2 | 6/2003 | Schmidt et al. | |
| 8,118,107 B2 * | 2/2012 | Coulombe | A01L 1/02 168/17 |
| 8,322,780 B2 | 12/2012 | Nagwanshi et al. | |
| 8,382,162 B2 | 2/2013 | Hourai | |
| 8,678,267 B2 | 3/2014 | Heck et al. | |
| 8,800,534 B2 * | 8/2014 | Kannan | F02M 61/168 123/468 |
| 2010/0051183 A1 | 3/2010 | Boke et al. | |
| 2011/0300378 A1 | 12/2011 | Karg et al. | |
| 2012/0034833 A1 | 2/2012 | Schaube et al. | |
| 2012/0088068 A1 | 4/2012 | Lim et al. | |
| 2013/0106138 A1 | 5/2013 | Brockhoff et al. | |
| 2013/0316148 A1 | 11/2013 | Gunnink | |
| 2014/0065427 A1 | 3/2014 | Allison et al. | |
| 2014/0178633 A1 | 6/2014 | Kleinschmidt et al. | |

FOREIGN PATENT DOCUMENTS

| | | |
|---|---|---|
| DE | 10002990 A1 | 8/2001 |
| DE | 102012022959 A1 | 5/2013 |
| EP | 1820870 A1 | 8/2007 |
| EP | 2105295 A1 | 9/2009 |
| EP | 2426000 A2 | 3/2012 |
| KR | 20120069967 A1 | 6/2012 |
| WO | 2009014486 A1 | 1/2009 |
| WO | 2013174460 A1 | 11/2013 |

* cited by examiner

COMPOSITE FUEL TANK SUPPORT

CROSS REFERENCE TO RELATED APPLICATION

This application claims the benefit of a provisional patent application with Ser. No. 62/033,262 filed on Aug. 5, 2014.

BACKGROUND OF THE INVENTION

1. Field of the Invention

The present invention relates generally to a composite fuel tank support.

2. Description of the Prior Art

The composite fuel tank support includes a strap having a base portion and at least one leg extending outwardly from the base portion to define a mounting area extending along the base portion from the leg for engaging a fuel tank of a vehicle. The strap is flexible and includes a plurality of reinforcement fibers interweaved together to provide tensile strength to the strap. A shield layer is disposed about the fortification layer and into the reinforcement fibers of the fortification layer of the strap. The shield layer defines an outer surface and an inner surface extending parallel to one another along the leg and the base portion to provide rigidity to the strap to protect the fortification layer of the strap. The strap and the shield layer define a bore disposed on a center axis (A) and extending through the at least one layer of the strap for engaging the vehicle. One such composite fuel tank support is disclosed in Canadian Patent Application CA 2,237,029.

SUMMARY OF THE INVENTION

The invention provides for such a composite fuel tank support wherein a compression limiter is disposed on the center axis (A) in the bore and extends between a pair of opposite facing limiter ends respectively at the inner surface and the outer surface of the shield layer.

Advantages of the Invention

The invention in its broadest aspect provides such a composite fuel tank support wherein the compression limiter protects the reinforcement fibers of the fortification layer from the compression force of fasteners and without diminishing or damaging the reinforcement fibers of the fortification layer to negatively affect the ability of the composite fuel tank support to carry the load in tension.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
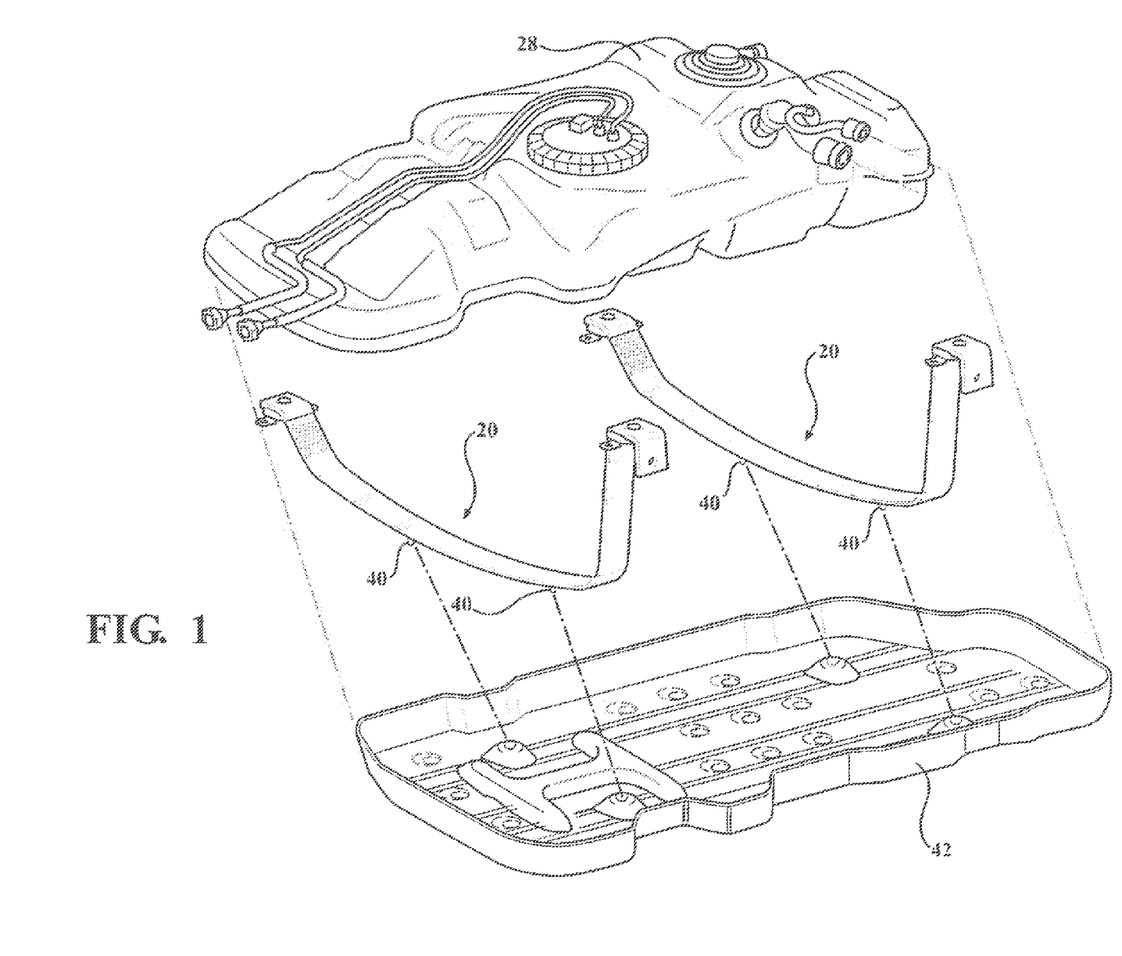
FIG. 1 is an exploded perspective view of an enabling embodiment including a composite fuel tank support, a fuel tank, and a shell.
Figure 2:
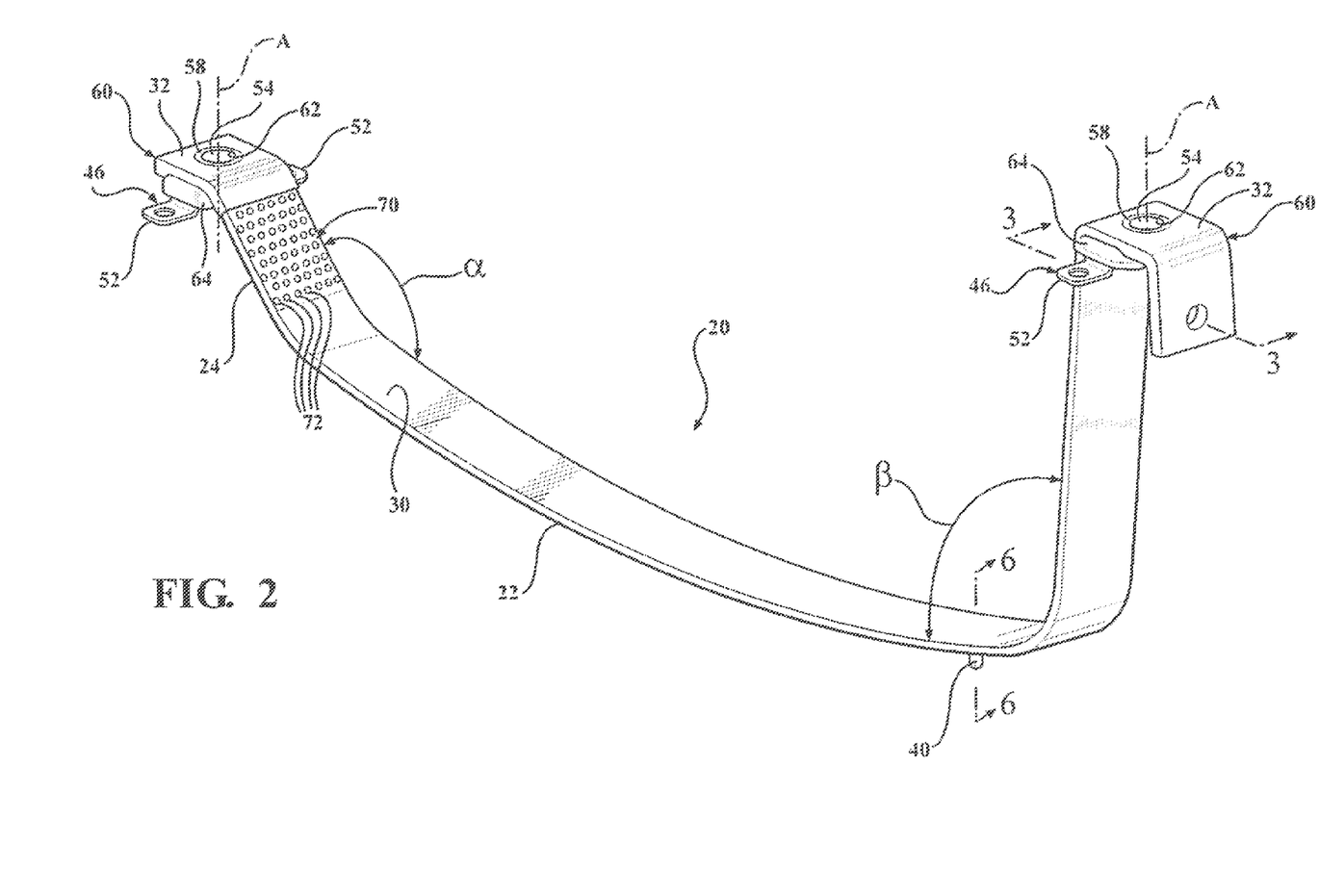
FIG. 2 is a perspective of the enabling embodiment of the composite fuel tank strap.

Referring to the Figures, wherein like numerals indicate corresponding parts throughout the several views, a composite fuel tank support, is generally shown in FIGS. 1 and 2.

The composite fuel tank support includes a strap 20 being elongated and having a U-shape 22, 24, 26 in a side view for engaging a fuel tank 28, as generally shown for a vehicle. The U-shape 22, 24, 26 of the strap 20 has a base portion 22 and a first leg 24 and a second leg 26. The first leg 24 and the second leg 26 each extend outwardly from the base portion 22 and are spaced apart from one another to define a mounting area 30 along the base portion 22 between the legs 24, 26 for engaging the fuel tank 28. The first leg 24 extends outwardly from the base portion 22 at an obtuse angle α of greater than 90° relative to the base portion 22. The second leg 26 extends outwardly and at a transverse, e.g. perpendicular angle β of 90°, relative to the base portion 22. Alternatively, instead of having a U-shape 22, 24, 26 as viewed in a side view, the strap 20 may have different shapes in the side view, e.g. an L-shape. In other words, instead of having a first leg 24 and the second leg 26, the strap 20 may only include a first leg 24 extending outwardly and at a transverse angle relative to the base portion 22.

Figure 3:
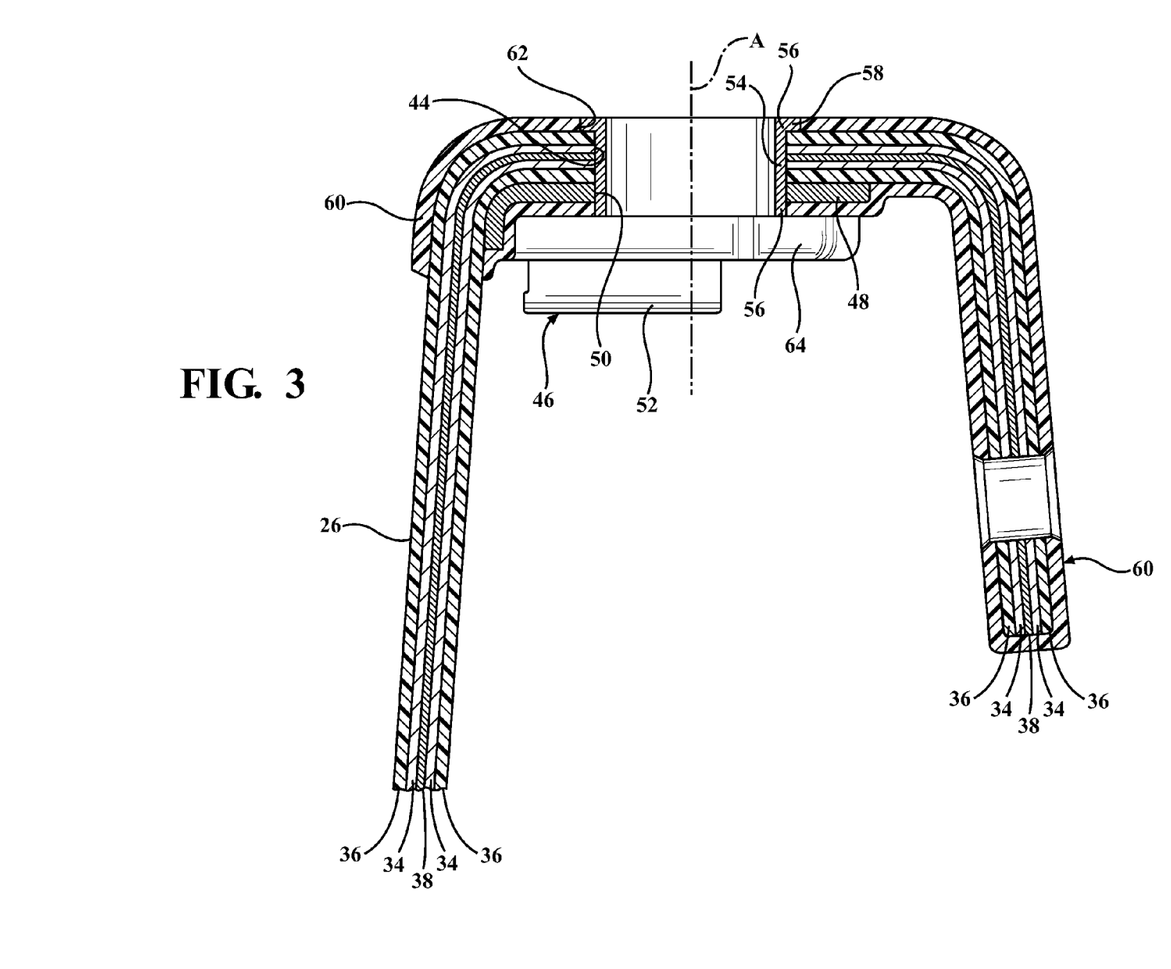
FIG. 3 is a fragmentary cross-sectional view taken along the lines 3-3 in FIG. 2.

An anchor 32 having a rectangular perimeter extends transversely from each of the legs 24, 26 with the anchors 32 extending in opposite directions from one another and in a parallel relationship with the base portion 22 for securing the strap 20 to the vehicle. The anchor 32 may also have a perimeter of different shape, e.g. circular. The strap 20 is flexible and defines a plurality of layers 34, 36, 38 including a fortification layer 34. The fortification layer 34 includes a plurality of reinforcement fibers interweaved together and selected from basalt fiber, carbon fiber, glass fiber, and aramid fiber. Alternatively, instead of being interwoven, the reinforcement fibers may be woven roved, meshed, intertwined, mingled, and/or interlaced together. In addition, the reinforcement fibers may be made from any one or a combination of basalt fiber, carbon fiber, glass fiber, and aramid fiber interweaved together. The fortification layer 34 extends between the anchors 32 to provide tensile strength to the strap 20. The strap 20 includes a shield layer 36 of plastic disposed about and into the reinforcement fibers of the fortification layer 34 and extending between and over the anchors 32. The shield layer 36 encloses the fortification layer 34 of the strap 20 and defines an outer surface and an inner surface extending in parallel relationship to one another between and over the anchors 32 for protecting the fortification layer 34 of the strap 20 to provide rigidity to the U-shape 22, 24, 26. In other words, the shield layer 36 is disposed over and into the reinforcement fibers to give the fibers rigidity and provide protection to the reinforcement fibers. The strap 20 includes an insert layer 38 of steel disposed or encased in the fortification layer 34 and extends between the anchors 32 to provide additional tensile strength to the strap 20. Alternatively, instead of having the insert layer 38, the strap 20 may only include the fortification layer 34 and the shield layer 36 to secure the fuel tank 28 to the vehicle.

Figure 6:
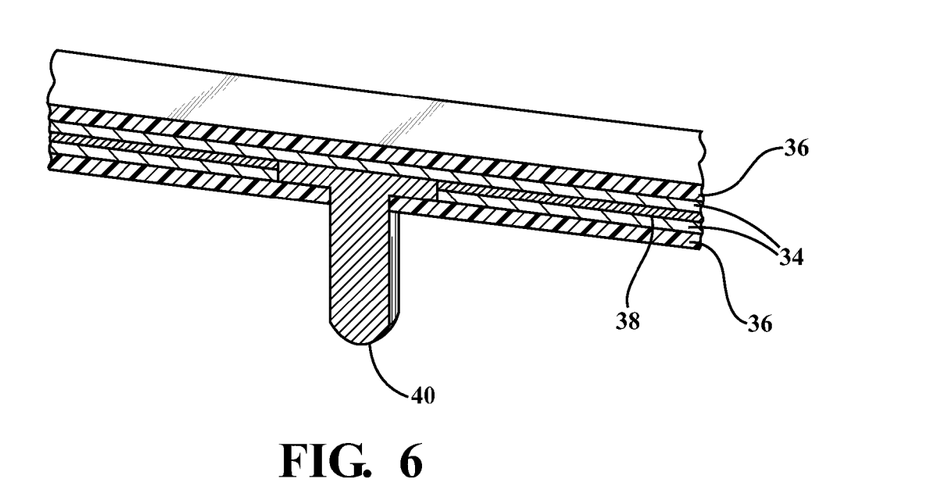
FIG. 6 is a cross-sectional view taken along the lines 6-6 in FIG. 2.

The base portion 22 includes a plurality of studs 40 of metal disposed spaced apart from one another along the base portion 22, and connected by a weld to the insert layer 38. The studs 40 extend outwardly from the insert layer 38 and through the fortification layer 34 and the shield layer 36 for securing a shell 42 to the strap 20. Alternatively, instead of welding, the studs 40 can be secured to the insert layer 38 by other methods such as adhesive bonding. In addition, the studs 40 can be embedded in the fortification layer 34 of the strap 20 and extends through the fortification layer 34 and the shield layer 36 for securing the shell 42 to the strap 20.

Each of the anchors 32 defines a bore 44 having circular shape disposed on a center axis A and extending through the fortification layer 34, the shield layer 36, and the insert layer 38 of the strap 20 for engaging the vehicle. A bracket 46, generally indicated, is of metal and has an inverted V-shape 22, 24, 26. The bracket 46 is disposed on the outer surface of the shield layer 36 and over the outer surface of each of the anchors 32. Each of the brackets 46 includes a plate 48 having a rectangular shape disposed on the outer surface of each of the anchors 32 and defining a hole 50 of circular shape disposed concentric to the center axis A and the bore 44. Each of the brackets 46 includes a pair of arms 52 extending in opposite directions from one another and extending in a plane spaced from and parallel to the plate 48 for attaching the strap 20 to a vehicle.

Figure 4:
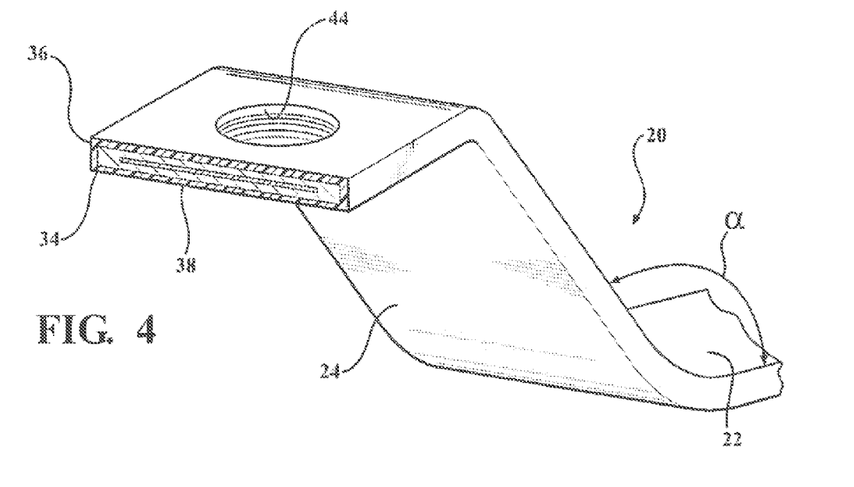
FIG. 4 is a fragmentary perspective cross-sectional view of the anchor of the first leg without the cover and the bracket.
Figure 7:
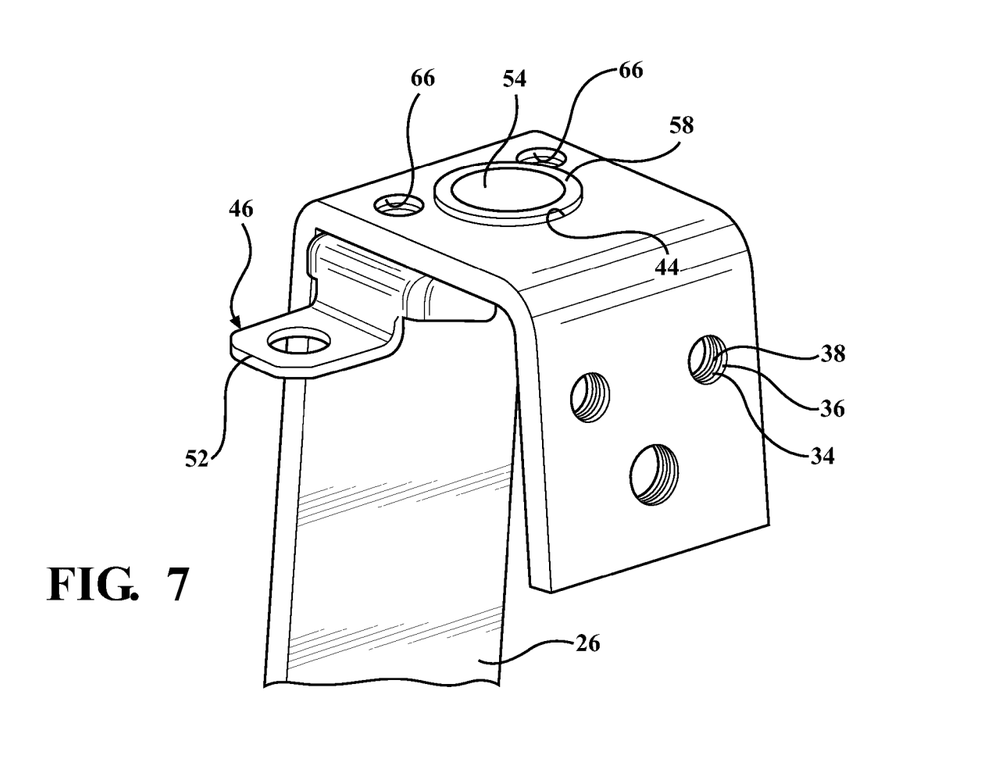
FIG. 7 is a fragmentary perspective cross-sectional view of the anchor of the second leg without the cover and the bracket.

A compression limiter 54 of brass and having a cylindrical shape extends between a pair of opposite facing limiter ends 56 respectively at the inner surface and the outer surface of the shield layer 36. In other words, the compression limiter 54 is disposed in the bore 44 for receiving a fastener to secure the strap 20 to the vehicle. In addition, the compression limiter 54 reduces the amount of forces applied to the strap 20 by the fastener to protect the strap 20 from damages which could impair the ability of the strap 20 to sustain forces in tension. It should be appreciated that, instead of brass, the compression limiter 54 may be made from other material such as but not limited to malleable metals, e.g. copper, or elastomers, e.g. rubber, so long as it can sustain the requisite compression forces. One of the limiter ends 56 adjacent to the inner surface includes an annular flange 58 extending radially outwardly from the limiter end 56 and about the center axis A for engaging the inner surface to retain the compression limiter 54 in the bore 44. In other words, the annular flange 58 extends outwardly from one of the limiter ends 56 and about the compression limiter 54 to engage the inner surface to prevent the compression limiter 54 from moving axially through the bore 44.

Figure 5:
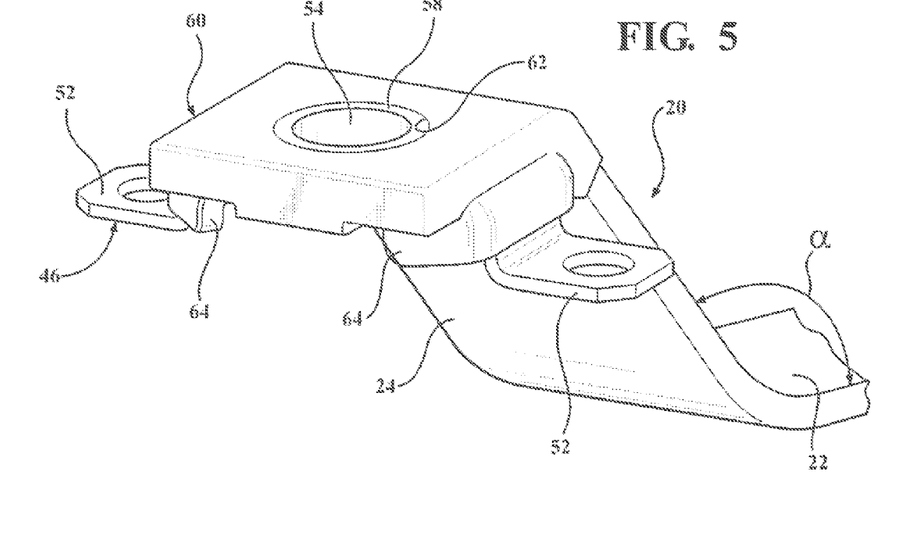
FIG. 5 is a fragmentary perspective similar to FIG. 4 but including the cover and the bracket.
Figure 8:
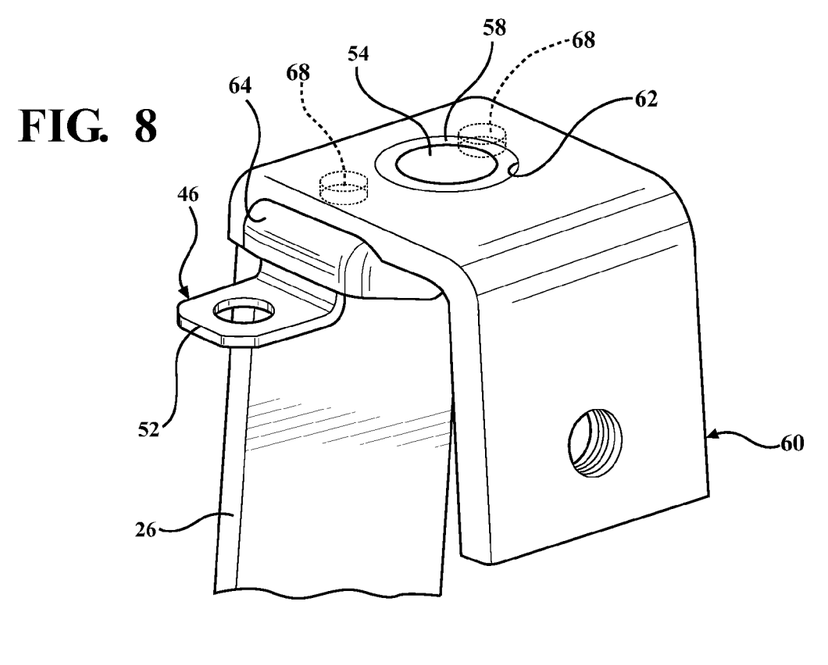
FIG. 8 is a fragmentary perspective view similar to FIG. 7 but including the cover and the bracket and as shown to the right in FIG. 2.

A cover 60, generally indicated, is of a fiber strengthened materials including plastic and strengthening fibers selected from one or combination of glass fiber, carbon fiber, aramid fiber, and basalt fiber. The cover 60 is disposed over each of the anchors 32 and the plate 48 of the associated one of the brackets 46 to protect the associated anchor 32 and secure the bracket 46 to the anchor 32. Each of the covers 60 defines a void 62 of circular shape disposed concentric to the bore 44 of each of the anchors 32 with the compression limiter 54 disposed in the void 62. Each of the covers 60 includes a pair of retention members 64 disposed spaced apart from one another and adjacent to the arms 52 of each of the brackets 46 extending outwardly from each of the covers 60 and around the arms 52 of each of the brackets 46 to protect the arms 52. Each of the anchors 32 further defines a pair of apertures 66 each of circular shape and disposed adjacent to the bore 44 and spaced apart from the bore 44 and one another. Each of the covers 60 includes a pair of nubs 68 disposed spaced apart from one another and extending through the apertures 66 of each of the anchors 32 to secure the covers 60 to the anchors 32.

Figure 9:
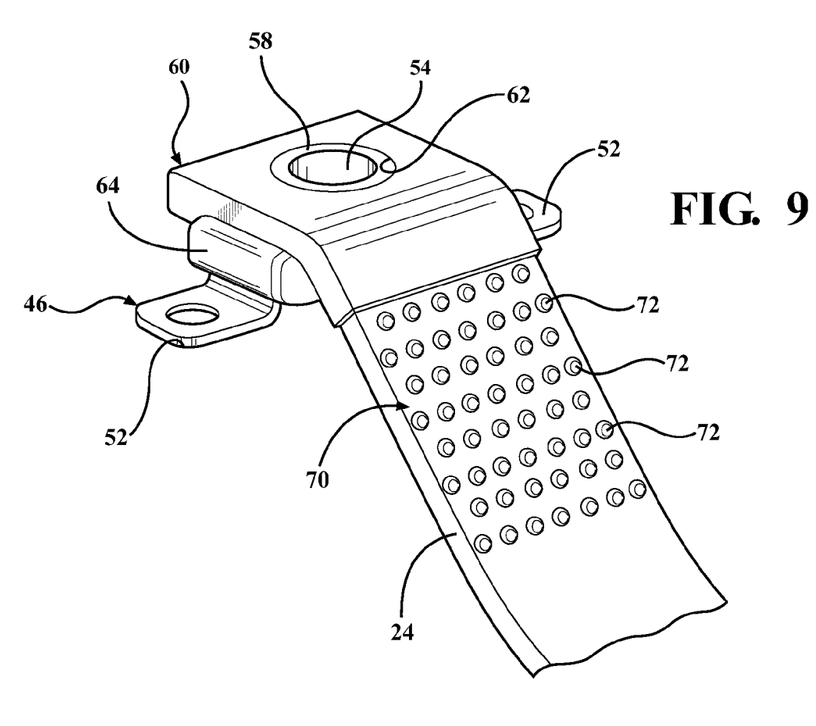
FIG. 9 is fragmentary perspective view of the anchor of the first leg including an anti-slip surface as shown to the left in FIG. 2.

The shield layer 36 defines an anti-slip surface 70, as generally indicated, disposed on the first leg 24 and extending between the anchor 32 and the base portion 22 for inhibiting movement of the strap 20 relative to the fuel tank 28 of the vehicle. The anti-slip surface 70 includes a plurality of projections 72 of hemispherical shape spaced apart from one another and protruding outwardly from the inner surface for engaging the fuel tank 28. In other words, once the fuel tank 28 is secured to the vehicle by the strap 20, the projections 72 of the anti-slip surface 70 tightly engages the fuel tank 28 to prevent the fuel tank 28 from moving.

Obviously, many modifications and variations of the present invention are possible in light of the above teachings and may be practiced otherwise than as specifically described while within the scope or the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A composite fuel tank support comprising;
   a strap (20) including a base portion (22) and at least one leg extending outwardly from said base portion (22) to define a mounting area (30) extending along said base portion (22) from said leg for engaging a fuel tank (28) of a vehicle,
   said strap (20) being flexible and including a fortification layer (34) of a plurality of reinforcement fibers interweaved together to provide tensile strength to said strap (20),
   a shield layer (36) disposed about said fortification layer (34) and into said reinforcement fibers of said fortification layer (34) of said strap (20) and defining an outer surface and an inner surface extending parallel to one another along said leg and said base portion (22) to provide rigidity to said strap (20) to protect said fortification layer (34) of said strap (20),
   said strap (20) and said shield layer (36) defining a bore (44) disposed on a center axis (A) and extending through said fortification layer (34) and said shield layer (36) of said strap (20) for engaging the vehicle,
   an anchor (32) extending transversely from said leg for securing said strap (20) to the vehicle,
   a bracket (46) disposed on said anchor (32) and said outer surface of said shield layer (36),
   said bracket (46) including a plate (48) disposed on said anchor (32) and defining a hole (50) disposed concentric to said center axis (A) and said bore (44), and
   characterized by
   said bracket (46) including a pair of arms (52) extending in opposite directions from one another and extending in a plane spaced from and parallel to said plate (48) for attaching said strap (20) to the vehicle, a compression limiter (54) disposed on said center axis (A) in said bore (44) and extending between a pair of opposite facing limiter ends (56) respectively at said inner surface and said outer surface of said shield layer (36).

2. A composite fuel tank support as set forth in claim 1 wherein one of said limiter ends (56) adjacent to said inner surface including an annular flange (58) extending radially outwardly from said limiter end (56) and about said center axis (A) for engaging said inner surface to retain said compression limiter (54) in said bore (44).

3. A composite fuel tank support as set forth in claim 1 wherein said compression limiter (54) is of brass.

4. A composite fuel tank support as set forth in claim 1 wherein said compression limiter (54) has a cylindrical shape disposed in said bore (44).

5. A composite fuel tank support as set forth in claim 1 wherein said plate (48) has a rectangular shape disposed on said anchor (32).

6. A composite fuel tank support as set forth in claim 1 further including a cover (60) disposed over said anchor (32) and said bracket (46) to protect said anchor (32) and secure said bracket (46) to said anchor (32).

7. A composite fuel tank (28) support as set forth in claim 6 wherein said cover (60) is of a fiber strengthened material.

8. A composite fuel tank support as set forth in claim 7 wherein said fiber strengthened material includes plastic and a strengthening fiber selected from glass fiber and carbon fiber and aramid fiber and basalt fiber.

9. A composite fuel tank support as set forth in claim 6 wherein said cover (60) defining a void (62) of circular shape disposed concentric to said bore (44) of said anchor (32).

10. A composite fuel tank support as set forth in claim 6 wherein said cover (60) including a pair of retention members (64) disposed spaced apart from one another and adjacent to said arms (52) of said bracket (46) extending outwardly from said cover (60) and around said arms (52) of said bracket (46) to protect said arms (52).

11. A composite fuel tank support as set forth in claim 6 wherein said anchor (32) defines a pair of apertures (66) each of circular shape disposed adjacent to said bore (44) and spaced apart from said bore (44) and one another.

12. A composite fuel tank support as set forth in claim 11 wherein said cover (60) includes a pair of nubs (68) of cylindrical shape disposed spaced apart from one another and extending through said apertures (66) of said anchor (32) to secure said cover (60) to said anchor (32).

13. A composite fuel tank support as set forth in claim 1 wherein said plurality of reinforcement fibers is selected from basalt fiber and carbon fiber and glass fiber and aramid fiber.

14. A composite fuel tank support as set forth in claim 1 wherein said shield layer (36) defining an anti-slip surface (70) disposed on said leg and extending between said anchor (32) and said base portion (22) for inhibiting movement of said strap (20) relative to the fuel tank (28) and the vehicle.

15. A composite fuel tank support as set forth in claim 14 wherein said anti-slip surface (70) includes a plurality of projections (72) of hemispherical shape spaced apart from one another and protruding outwardly from said inner surface for engaging the fuel tank (28).

16. A composite fuel tank support comprising;

a strap (20) being elongated and in a U-shape (22, 24, 26) in side view for engaging a fuel tank (28) of a vehicle, said U-shape (22, 24, 26) including a base portion (22) and at least one leg including a first leg (24) and a second leg (26) extending outwardly from said base portion (22) and spaced apart from one another to define a mounting area (30) extending along said base portion (22) from said legs (24, 26) for engaging the fuel tank (28), said first leg (24) extending outwardly from said base portion (22) at an obtuse angle (α) of greater than 90° relative to said base portion (22) and said second leg (26) extending outwardly and at a transverse and perpendicular angle (β) of 90° relative to said base portion (22), an anchor (32) having a rectangular perimeter and extending transversely from each of said legs (24, 26) and in opposite directions from one another and in a parallel relationship with said base portion (22) for securing said strap (20) to the vehicle, said strap (20) being flexible and defining a plurality of layers (34, 36, 38) including a fortification layer (34) having a plurality of reinforcement fibers interweaved together and selected from basalt fiber and carbon fiber and glass fiber and aramid fiber and extending between said anchors (32) to provide tensile strength to said strap (20), said strap (20) including a shield layer (36) of plastic disposed about and into said reinforcement fibers of said fortification layer (34) and extending between and over said anchors (32) and enclosing said fortification layer (34) of said strap (20) and defining an outer surface and an inner surface extending in parallel relationship to one another between and over said anchors (32) for protecting said fortification layer (34) of said strap (20) to provide rigidity to said U-shape (22, 24, 26), said strap (20) including an insert layer (38) of steel disposed in said fortification layer (34) and extending between said anchors (32) to provide additional tensile strength to said strap (20), said base portion (22) including a plurality of studs (40) of metal spaced apart from one another along said base portion (22) and connected by a weld to said insert layer (38) and extending outwardly from said insert layer (38) and through said fortification layer (34) and said shield layer (36) for securing a shell (42) to said strap (20), each of said anchors (32) defining a bore (44) of circular shape disposed on a center axis (A) and extending through said fortification layer (34) and said shield layer (36) and said insert layer (38) of said strap (20) for engaging the vehicle, a bracket (46) having an inverted U-shape (22, 24, 26) of metal disposed on each of said anchors (32) and said outer surface of said shield layer (36), each of said brackets (46) including a plate (48) of rectangular shape disposed on said outer surface of each of said anchors (32) and defining a hole (50) of circular shape disposed concentric to said center axis (A) and said bore (44), each of said brackets (46) including a pair of arms (52) extending in opposite directions from one another and extending in a plane spaced from and parallel to said plate (48) for attaching said strap (20) to a vehicle, and characterized by, a compression limiter (54) of brass and having a cylindrical shape extending between a pair of opposite facing limiter ends (56) respectively at said inner surface and said outer surface of said shield layer (36), one of said limiter ends (56) adjacent to said inner surface including an annular flange (58) extending radially outwardly from said limiter end (56) and about said center axis (A) for engaging said inner surface to retain said compression limiter (54) in said bore (44), a cover (60) of a fiber strengthened polymer including plastic and a strengthening fiber selected from glass fiber and carbon fiber and aramid fiber and basalt fiber and disposed over each of said anchors (32) and said plate (48) of the associated one of said brackets (46) to protect said anchor (32) and secure said bracket (46) to said anchor (32), each of said covers (60) defining a void (62) of circular shape disposed concentric to said bore (44) of each of said anchors (32) with said compression limiter (54) disposed in said void (62), each of said covers (60) including a pair of retention members (64) disposed spaced apart from one another and adjacent to said arms (52) of each of said brackets (46) extending outwardly from each of said covers (60) and around said arms (52) of each of said brackets (46) to protect said arms (52), each of said anchors (32) each further defining a pair of apertures (66) each of circular shape disposed adjacent to said bore (44) and spaced apart from said bore (44) and one another, each of said covers (60) including a pair of nubs (68) disposed spaced apart from one another and extending through said apertures (66) of each of said anchors (32) to secure said covers (60) to said anchors (32), said shield layer (36) defining an anti-slip surface (70) disposed on said first leg (24) and extending between said anchor (32) and said base portion (22) for inhibiting movement of said strap (20) relative to the fuel tank (28) of the vehicle, said anti-slip surface (70) further including a plurality of projections (72) of hemispherical shape spaced apart from one another and protruding outwardly from said inner surface for engaging the fuel tank (28).

\* \* \* \* \*